(12) United States Patent
Truvé et al.

(10) Patent No.: US 12,289,320 B2
(45) Date of Patent: Apr. 29, 2025

(54) NETWORK SECURITY SCORING

(71) Applicants: Staffan Truvé, Alingsås (SE); Bill Ladd, Watertown, MA (US)

(72) Inventors: Staffan Truvé, Alingsås (SE); Bill Ladd, Watertown, MA (US)

(73) Assignee: Recorded Future, Inc., Somerville, MA (US)

( * ) Notice: Subject to any disclaimer, the term of this patent is extended or adjusted under 35 U.S.C. 154(b) by 0 days.

(21) Appl. No.: 15/480,287

(22) Filed: Apr. 5, 2017

(65) Prior Publication Data

US 2018/0063170 A1   Mar. 1, 2018

Related U.S. Application Data

(60) Provisional application No. 62/458,326, filed on Feb. 13, 2017, provisional application No. 62/318,758, filed on Apr. 5, 2016.

(51) Int. Cl.
| | |
|---|---|
| *H04L 9/40* | (2022.01) |
| *G06N 20/00* | (2019.01) |
| *G06N 20/10* | (2019.01) |
| *H04L 41/12* | (2022.01) |
| *H04L 43/045* | (2022.01) |

(Continued)

(52) U.S. Cl.
CPC ......... *H04L 63/1416* (2013.01); *G06N 20/00* (2019.01); *G06N 20/10* (2019.01); *H04L 41/12* (2013.01); *H04L 43/045* (2013.01); *H04L 43/06* (2013.01); *H04L 61/2503* (2013.01); *H04L 61/4511* (2022.05); *H04L 63/1425* (2013.01); *H04L 63/1433* (2013.01); *H04L 63/20* (2013.01); *H04L 69/22* (2013.01)

(58) Field of Classification Search
CPC ... H04L 63/1416; H04L 41/12; H04L 43/045; H04L 43/06; H04L 61/1511; H04L 61/2503; H04L 63/1425; H04L 63/1433; H04L 63/20; H04L 69/22; G06N 20/00
See application file for complete search history.

(56) References Cited

U.S. PATENT DOCUMENTS

| | | | |
|---|---|---|---|
| 8,832,832 B1 * | 9/2014 | Visbal ................... | H04L 63/14 726/25 |
| 9,473,522 B1 * | 10/2016 | Kotler .................. | G06F 21/577 |

(Continued)

*Primary Examiner* — Trang T Doan
(74) *Attorney, Agent, or Firm* — Kristofer E. Elbing (57) ABSTRACT

A network security system includes a network interface configured to connect to a public wide area network and a first malicious activity detection subsystem configured to extract from textual sources on the network different threat levels in a first threat category for addresses on the wide area network. One or more further malicious activity detection subsystems are configured to extract from textual sources on the network different threat levels in one or more further threat categories. A weighting subsystem is configured to provide weighted threat levels for addresses on the wide area network for the first and further malicious activity detection subsystems. A scoring subsystem is responsive to the weighting subsystem to derive an aggregated, weighted threat score for each of the network addresses. An address proximity engine can determine a measure of logical proximity of network addresses independently of any measure of physical proximity between them.

28 Claims, 10 Drawing Sheets

(51) Int. Cl.
*H04L 43/06* (2022.01)
*H04L 61/2503* (2022.01)
*H04L 61/4511* (2022.01)
*H04L 69/22* (2022.01)

(56) References Cited

U.S. PATENT DOCUMENTS

| | | | | |
|---|---|---|---|---|
| 2014/0283085 A1* | 9/2014 | Maestas | H04L 63/1433 | 726/25 |
| 2014/0298460 A1* | 10/2014 | Xue | H04L 63/1425 | 726/23 |
| 2015/0163235 A1* | 6/2015 | Coskun | H04L 63/1408 | 726/22 |
| 2015/0170152 A1* | 6/2015 | Shaffer | G06Q 30/016 | 705/304 |
| 2015/0200962 A1* | 7/2015 | Xu | G06F 21/562 | 726/23 |
| 2015/0215332 A1* | 7/2015 | Curcic | H04L 63/20 | 726/25 |
| 2015/0215334 A1* | 7/2015 | Bingham | H04L 63/1425 | 726/23 |
| 2015/0237062 A1* | 8/2015 | Roytman | H04L 63/1433 | 726/25 |
| 2016/0028749 A1* | 1/2016 | Murynets | H04L 63/1433 | 726/22 |
| 2016/0028758 A1* | 1/2016 | Ellis | G06F 21/52 | 726/25 |
| 2016/0065599 A1* | 3/2016 | Hovor | H04L 67/20 | 726/23 |
| 2017/0032417 A1* | 2/2017 | Amendjian | G06Q 30/0254 | |
| 2017/0099314 A1* | 4/2017 | Klatt | H04L 63/1483 | |
| 2018/0027006 A1* | 1/2018 | Zimmermann | H04L 63/0227 | 726/11 |

* cited by examiner

NETWORK SECURITY SCORING

CROSS-REFERENCE TO RELATED APPLICATION

This application is claims priority to U.S. Provisional Application Ser. No. 62/318,758, filed Apr. 5, 2016 and to U.S. Provisional Application Ser. No. 62/458,326, filed Feb. 13, 2017, which are both entitled NETWORK SECURITY SCORING and are both herein incorporated by reference.

FIELD OF THE INVENTION

This invention relates to methods and apparatus for evaluating security and/or protecting systems on large computer networks, such as the internet.

BACKGROUND OF THE INVENTION

Administrators of large private networks, such as corporate or governmental networks, need to take steps to secure them from various types of attacks. To this end lists of blacklisted Internet Protocol (IP) addresses and Internet Domain Names (IDN) have been developed and made available. These are developed by specialized technical methods, including through the use of honey pots. Honey pots provide network resources that are deliberately set up to attract malicious activity. IP addresses and IDNs from which the activity originates can then be included on the blacklist. Despite the availability of these lists and a variety of other security tools, securing a network remains a very difficult task that is often unsuccessful. In particular, the defenders of systems are generally one step behind the attackers, reacting to already identified attacks and not being able to prevent future ones.

SUMMARY OF THE INVENTION

In one general aspect, the invention features a network security system that includes a network interface operative to connect the system to a public wide area network and a first malicious activity detection subsystem operatively connected to the network interface and operative to extract from textual sources on the network different threat levels in a first threat category for each of at least some addresses on the wide area network. One or more further malicious activity detection subsystems are operatively connected to the network interface and operative to extract from textual sources on the network different threat levels in each of one or more further threat categories for each of at least some addresses on the wide area network. A weighting subsystem is responsive to each of the first and further malicious activity detection subsystems and operative to provide weighted threat levels for each of a plurality of addresses on the wide area network for both the first and further malicious activity detection subsystems. And a scoring subsystem is responsive to the weighting subsystem and operative to derive an aggregated, weighted threat score for each of the network addresses.

In preferred embodiments, the system can further include a threat level quantizer responsive to the scoring subsystem and operative to quantize the weighted score for an address into one of a plurality of different discrete threat levels. The system can further include a user interface area responsive to the scoring subsystem and the quantizer and operative to display the threat score in a manner that also conveys one of the threat levels. The system can further include a user interface area responsive to the scoring subsystem and the quantizer and operative to display the threat score in a color that also conveys one of the threat levels. The system can further include a user interface area responsive to the scoring subsystem and operative to display the threat score. The system can further include a further user interface area that is operative to display threat levels from which the displayed threat score was derived. The first and further malicious activity detection subsystems can be operative to detect malicious activity associated with an IP address. The first and further malicious activity detection subsystems can be operative to detect malicious activity associated with a URL. The first and further malicious activity detection subsystems can be operative to detect malicious activity associated with an Internet Domain Name.

In another general aspect, the invention features a network security system that includes a source of malicious addresses that lists network addresses associated with malicious activity, an address proximity engine responsive to the source of malicious activity data that is operative to determine a measure of physical or logical proximity between network addresses, and a threat scoring subsystem responsive to the address proximity engine and to the source of malicious addresses that is operative to derive a score for a particular network address based on its physical or logical proximity to at least one of the malicious addresses from the source of malicious addresses.

In preferred embodiments the threat scoring subsystem can be operative to derive a threat score based on threats from a plurality of different physically or logically proximate malicious addresses. The threat scoring subsystem can include weighted averaging logic operative to derive a threat score based on a weighted average of threats from a plurality of malicious addresses at different degrees of proximity. The source of malicious addresses and the address proximity engine can be operative on IP addresses. The source of malicious addresses and the address proximity engine can be operative on URLs. The address proximity engine can detect proximity at least in part based on membership in subnets. The address proximity engine can detect proximity at least in part based on associations extracted from content on the network. The source of malicious addresses and the address proximity engine can be operative on Internet Domain Names. The source of malicious addresses and the address proximity engine can be operative on an autonomous system level.

In a further general aspect, the invention features a network security system that includes a network interface operative to connect the system to a public wide area network, a first activity detection subsystem operatively connected to the network interface and operative to extract information from textual sources on the network over a period of time, one or more further activity detection subsystems operatively connected to the network interface and operative to extract from textual sources on the network over a period of time, and a threat prediction subsystem responsive to each of the first and further activity detection subsystems and operative to predict future threat levels for each of a plurality of addresses on the wide area based on the application of a trained predictive model to the extracted information from the first and further activity detection subsystems.

In preferred embodiments, the threat prediction subsystem can employ a Support Vector Machine supervised learning model. The prediction subsystem can be responsive to an address proximity engine that is operative to determine a measure of physical or logical proximity between network addresses. The first activity detection subsystem can detect non-malicious behavior of known bad actors. The activity detection subsystems can be operative to detect activity from sources that include open web, social media, forums, paste sites, and dark net sites such as TOR/Onion sites. The activity detection subsystems can be operative to detect activity associated with technical entities including hashes, filenames and malware. The activity detection subsystems can be operative to detect activity associated with events including cyber attacks, exploits, and data leaks. The threat prediction subsystem can be operative to classify information according to ontologies. The threat prediction subsystem can be operative to calculate a risk score.

Systems according to the invention can help network administrators to understand and assess threats in a meaningful way. They can also allow threats to be discovered based on the context of a neighborhood in which a target resides, and to give early warning of future malicious IP addresses and IDNs.

DETAILED DESCRIPTION OF AN ILLUSTRATIVE EMBODIMENT

Figure 1:
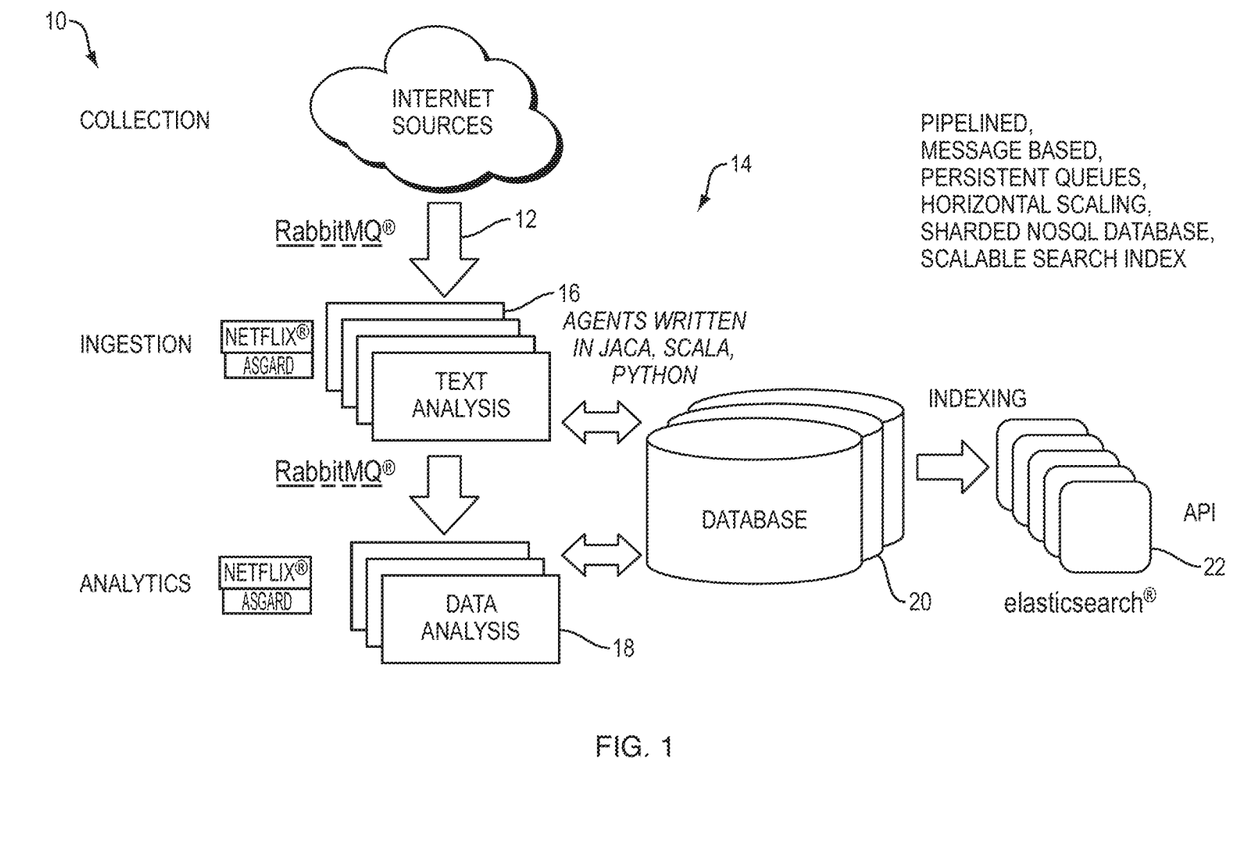
FIG. 1 is a block diagram of an illustrative threat scoring system according to the invention.

Referring to FIG. 1, a threat scoring system 10 includes a collection subsystem 12 that collects information about addresses, such as IP addresses and Internet Domain Names (IDNs) on a network such as the internet. This subsystem can collect a variety of different kinds of information. An important source of information is textual information posted on parts of the internet, such as the web. Another important source of information, which is discussed below, is in the way the information is organized on the internet, such as by its different address spaces. The system can also collect threat information from any other suitable sources, including third-party blacklists and the like.

The scoring system 10 also includes an analysis subsystem 14 that can include a text analysis subsystem 16 and a data analysis system 18. The text analysis subsystem extracts meaning information from the collected textual information, such as by using natural language processing techniques. This extracted meaning information is stored, such as in a database 20.

The data analysis subsystem 14 analyzes the extracted meaning information to determine whether it includes information that represents a potential threat. Discussions of security flaws or known exploits, for example, can be treated as representing a threat. This extracted meaning information is then stored, such as in the database. An indexing subsystem organizes the threat information that it stores, so that it can be accessed by one or more application programming interfaces 22 (APIs).

Figure 2:
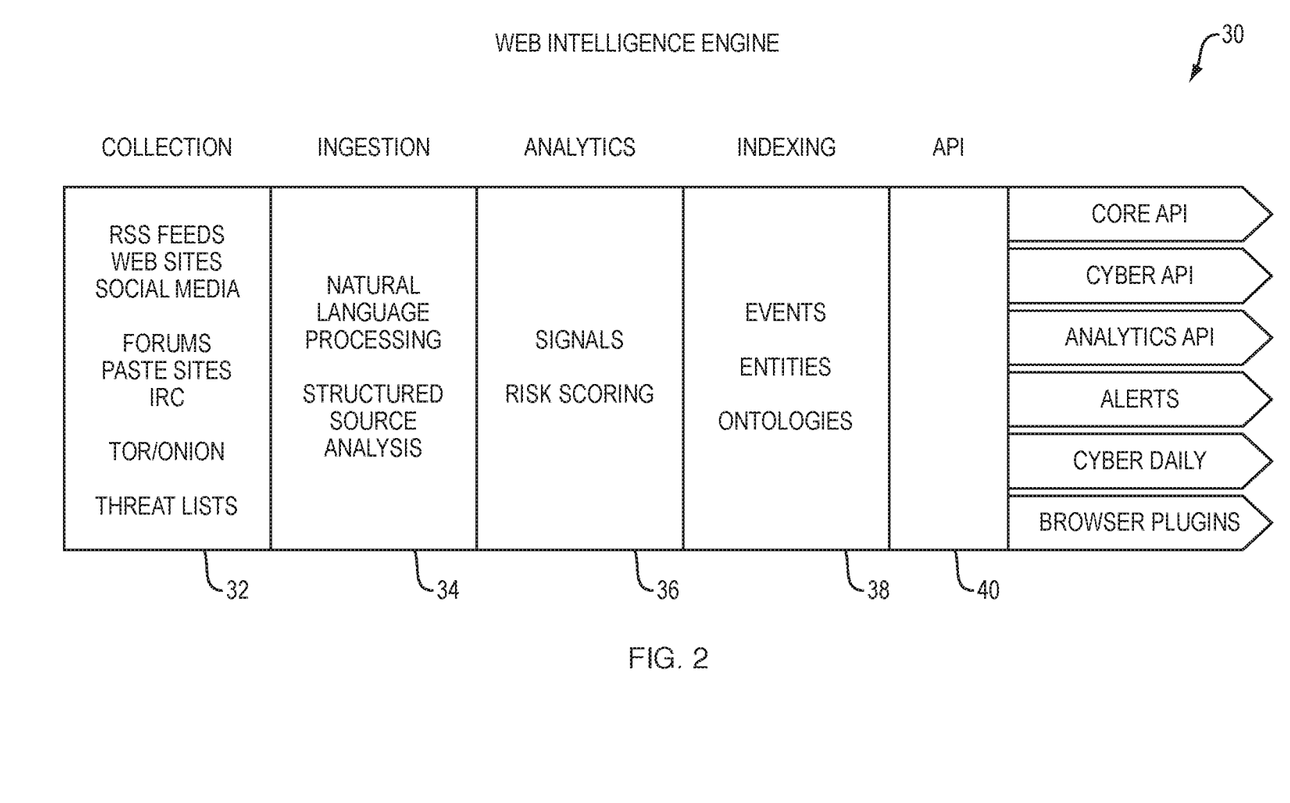
FIG. 2 is a block diagram of a web intelligence engine for the threat scoring system of FIG. 1.

Referring to FIG. 2, the threat scoring system 10 can be viewed as including a layered web intelligence engine 30. It includes a collection layer 32 that can collect information from sources such as RSS feeds, web sites, social media, forums, paste sites, honey pots, IRC, TOR/Onion, and threat lists. It also includes an ingestion layer 34 that performs ingestion functions such as natural language processing and structured source analysis. An analytics layer 36 signals and scores threats. The resulting information can then be indexed by an indexing layer 38. An API layer 40 makes the indexed information available in different ways.

The scoring portion of the analytics layer can derive aggregated threat scores for parts of the network, such as IP addresses, IDNs or URLs. The aggregated threat scores are derived from more than one source of information in a process that can assign different importance levels to different threat sources. This process can simply aggregate threat information, such as by using a weighted average. Or it can use a more sophisticated approach, such as a rule set that can express more complex relationships. This can allow the importance of certain types of threats to be gated based on the presence of others, for example. The relationships are specific to particular situations and technologies and it is expected that they may have to be adjusted over time or for different types of threat detection.

Figure 3:
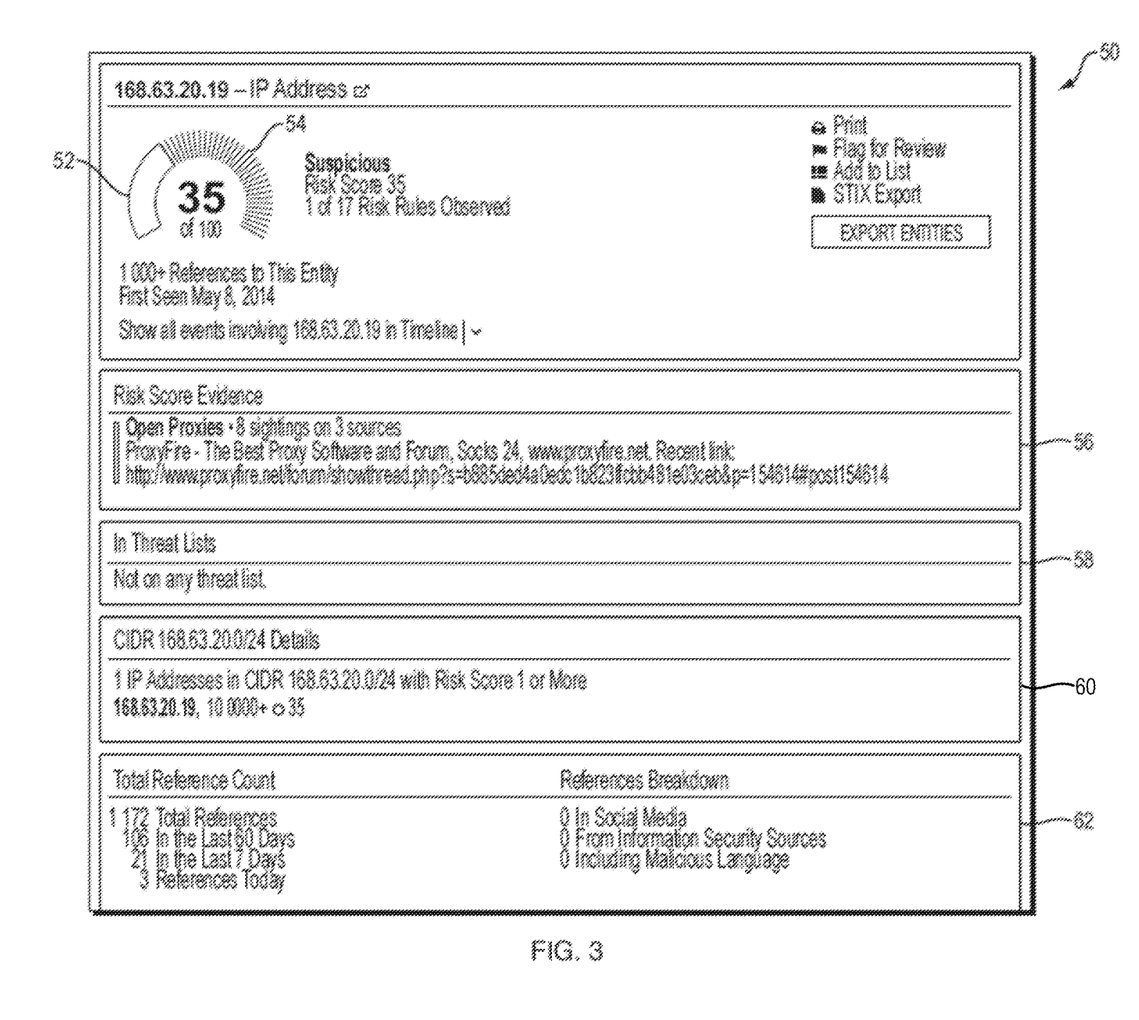
FIG. 3 is a screenshot of an illustrative threat snapshot for the threat scoring system of FIG. 1.

Referring to FIG. 3, aggregated threat score can be provided in a variety of machine-readable and user-readable formats. One user-readable format is a threat snapshot 50 that visually presents the threat score for an IP address or IDN. In one embodiment, the threat snapshot shows the threat score numerically 52 with a wrap-around, color-coded bar graph 54 that surrounds the numeric score. Shown with the threat score is a categorization indicator that categorizes the threat level into categories, such as "suspicious." In one embodiment, scores range from 0-100, with the following categories:

| | |
|---|---|
| Gray | No Suspicious/Malicious content: 0 |
| | Unusual: 5-24 |
| Yellow | |
| | Suspicious: 25-64 |
| Red | |
| | Malicious: 65-89 |
| | Very Malicious: 90-100 |

The threat snapshot 50 can also show context information that helps to explain how the score was provided, such as the number of references to the entity found, and date first seen. This information can also be shown on a timeline. An evidence box 56 can provide links to evidence of maliciousness, a threat list box 58 can indicate whether the IP address or IDN is on a threat list, and a total reference count box 60 can break threat information down in further ways. The threat snapshot can also include a neighborhood score box 62 that presents a neighborhood score.

Neighborhood Scoring

A neighborhood score is derived from the portion of the network that the threat information is derived from. This type of score expresses a threat level that is based on the physical or logical neighborhood in which an IP address or IDN resides. Neighborhood scoring can be based on proximity of Internet Protocol (IP) addresses, Uniform Resource Locators (URLs), Autonomous System (AS) numbers, IDN name similarity judged by editing distance, or any other relevant proximity measure. The score can take a variety of forms, such as a numerical value, a qualitative category, or even a simple flag.

Figure 4:
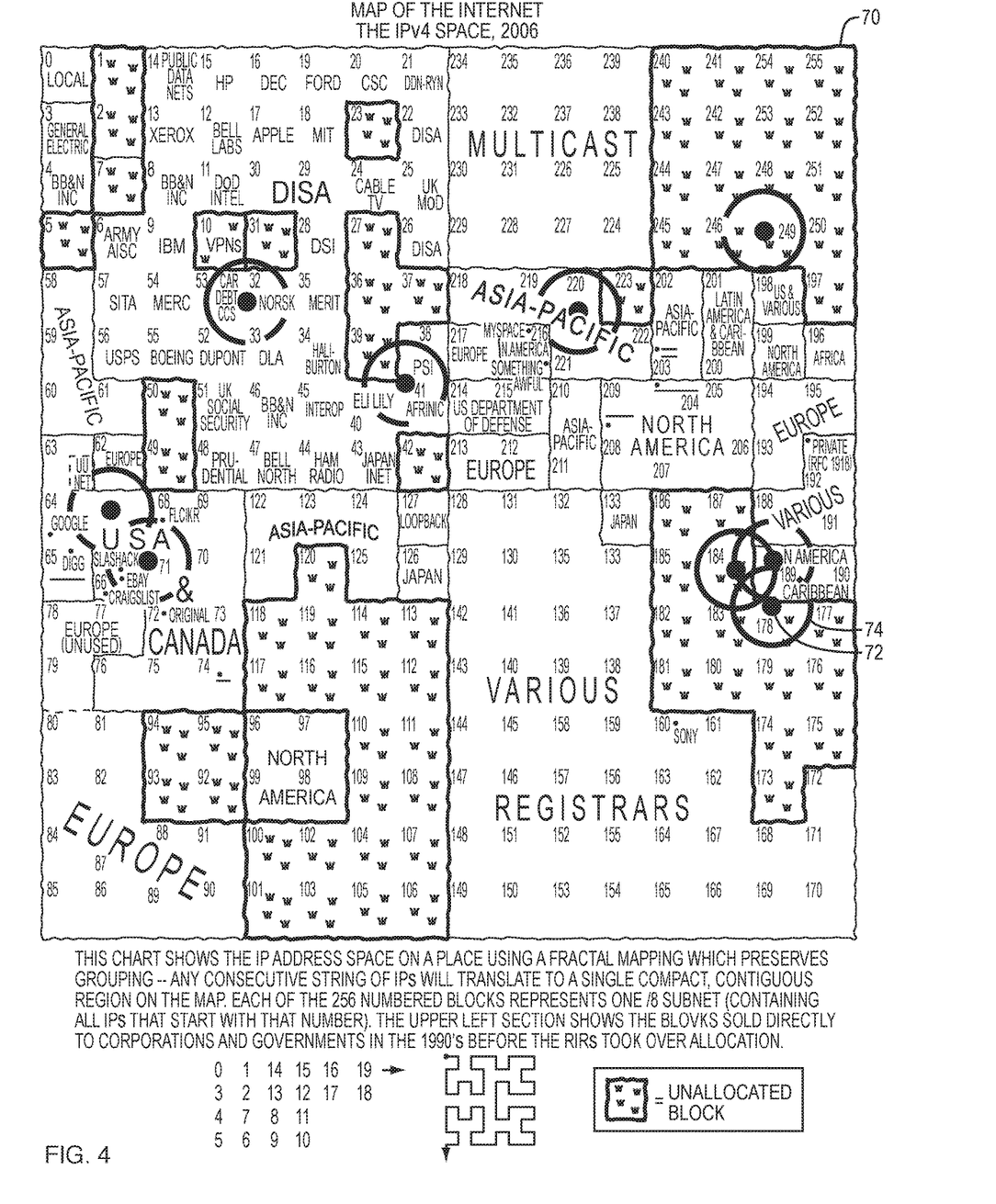
FIG. 4 is an illustrative IP address space diagram showing IP addresses that present a known threat and their neighborhoods in the IP address space.
Figure 5:
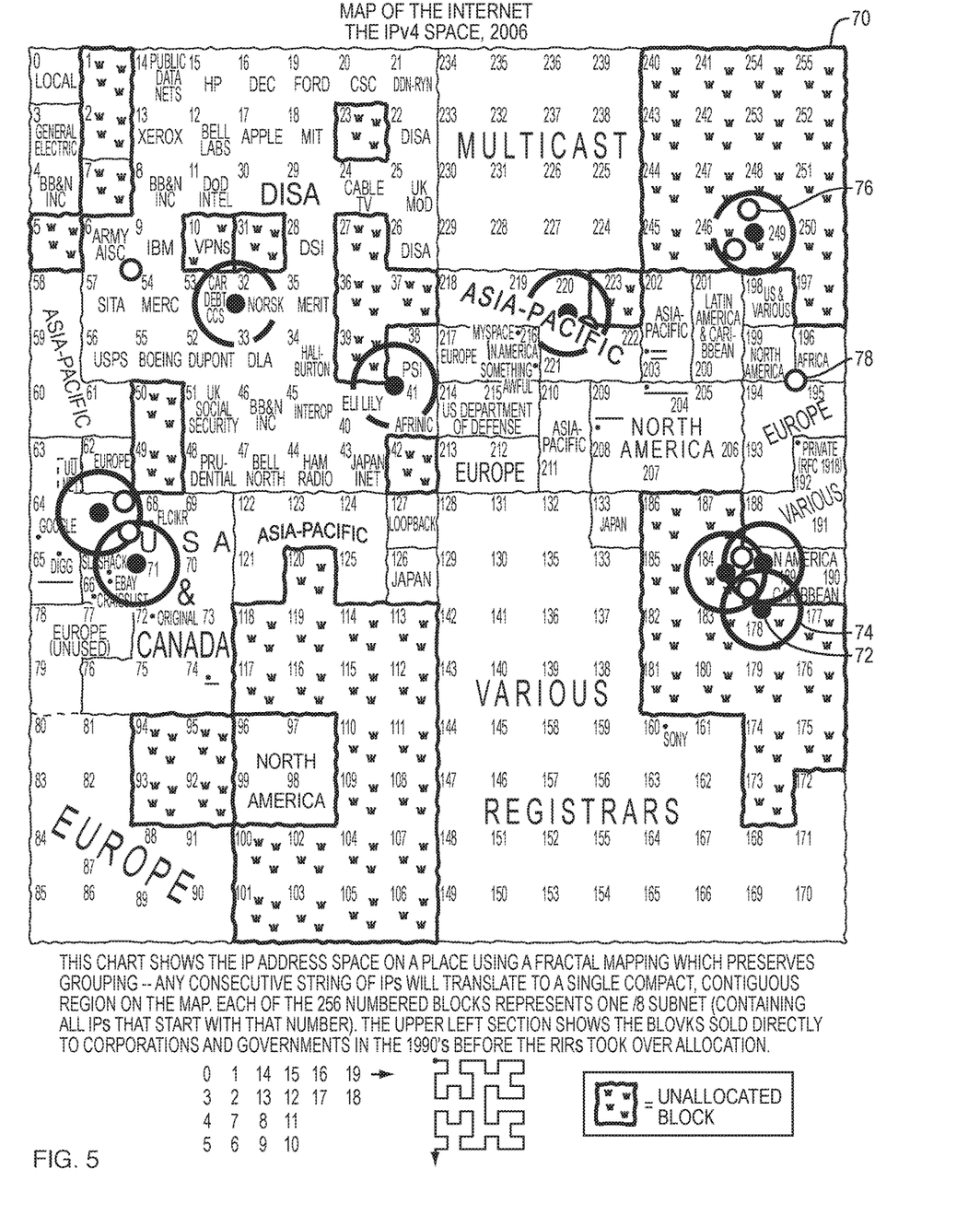
FIG. 5 is the illustrative IP address space diagram of FIG. 4 with target IP addresses added.
Figure 6:
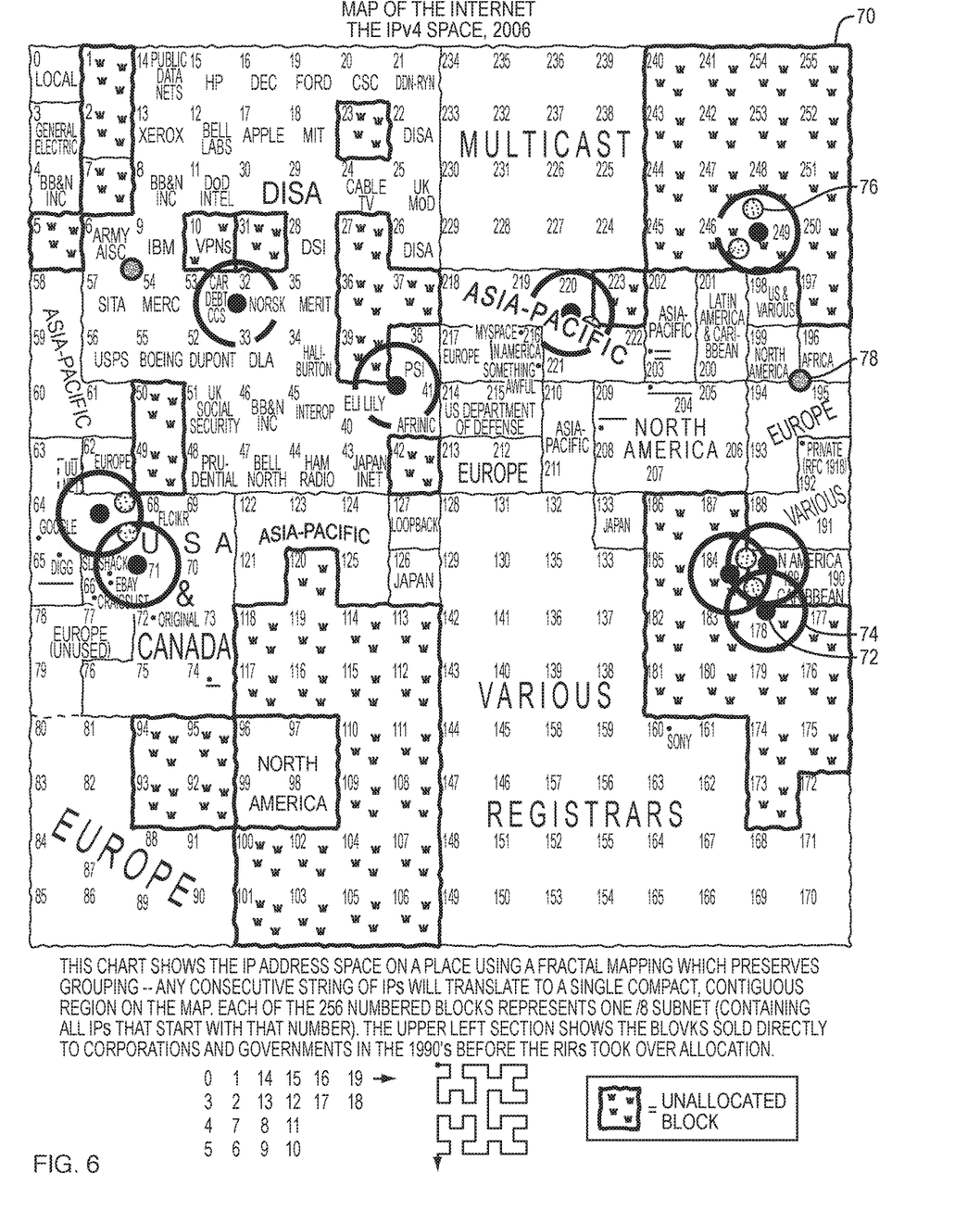
FIG. 6 is the illustrative IP address space diagram of FIG. 4 showing the results of neighborhood threat processing.

FIGS. 4-6 provide a simple illustration of how neighborhood scoring works based on a 2006 map of internet addresses associated with the IPv4 address space. As shown in FIG. 4, IP addresses 72 associated with known threats reside within neighborhoods 74 in the address space on the network 70. As shown in FIG. 5, target addresses 76, 78 may or may not be located within these neighborhoods. And as shown in FIG. 6, target addresses that are located in the neighborhoods can be flagged as potentially malicious 76 and those that aren't located in the neighborhoods can be left unflagged 78.

Figure 7:
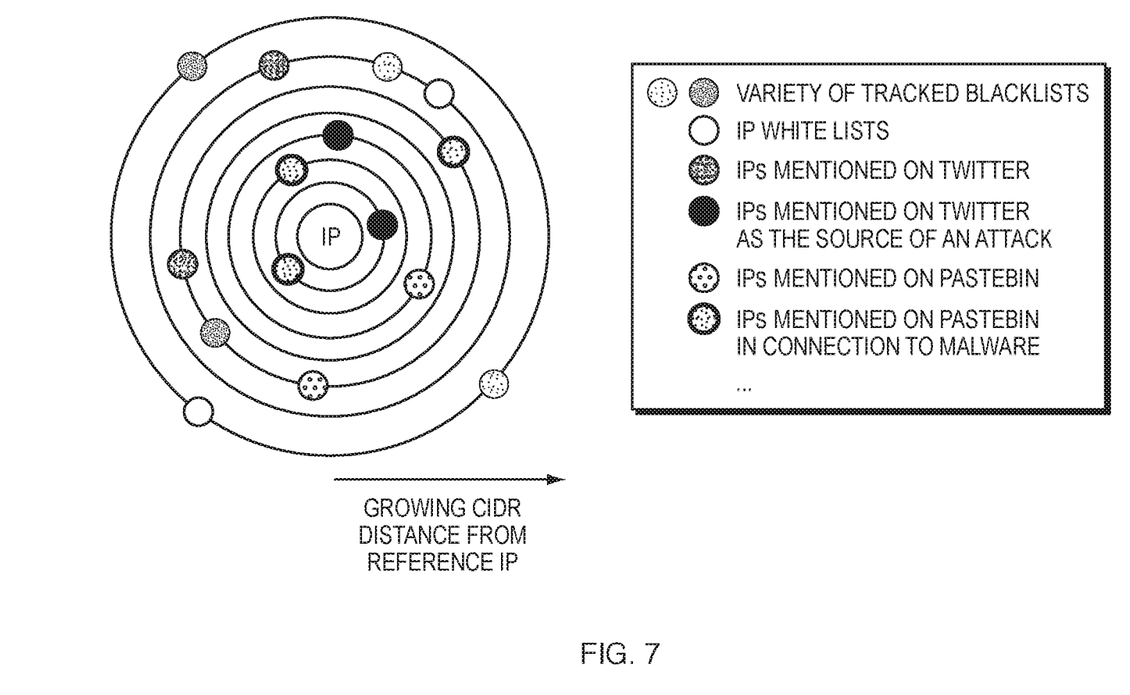
FIG. 7 is a diagram illustrating a more refined neighborhood threat processing approach according to the invention.

FIG. 7 shows a more refined neighborhood scoring scheme that can provide a much better understanding of maliciousness. In this approach, target addresses can be associated with a score that relates to both proximity and the nature of a proximate threat or threats, and/or any other suitable metric, instead of being simply flagged.

One way to test proximity is to look at subnets within IP addresses. In the case of IP address 128.17.15.7, for example, the "7" is part of a lower-level subnet and the "15" is part of a higher-level subnet that encompasses the lower-level subnet (the subnets can be broken down into finer, bitwise pieces). Networks can also be defined by other groupings, such as through AS numbers, IDNs, URLs, or any other suitable organizational scheme. Proximity can be expressed as a CIDR distance metric in IP space:

$$d_{CIDR}(x,y)=\inf\{i:x>>i==y>>i\}$$

or by some other distance metric in other spaces.

Predictive Scoring

Figure 8:
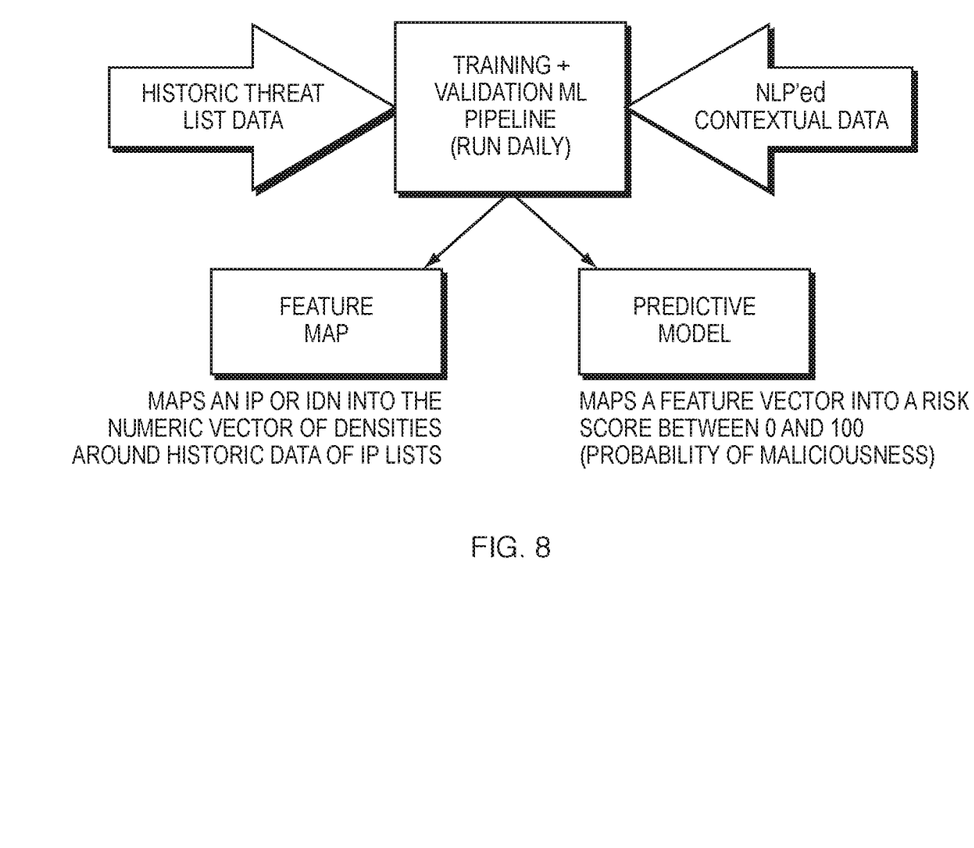
FIG. 8 is a block diagram illustrating a predictive scoring system according to the invention.
Figure 9:
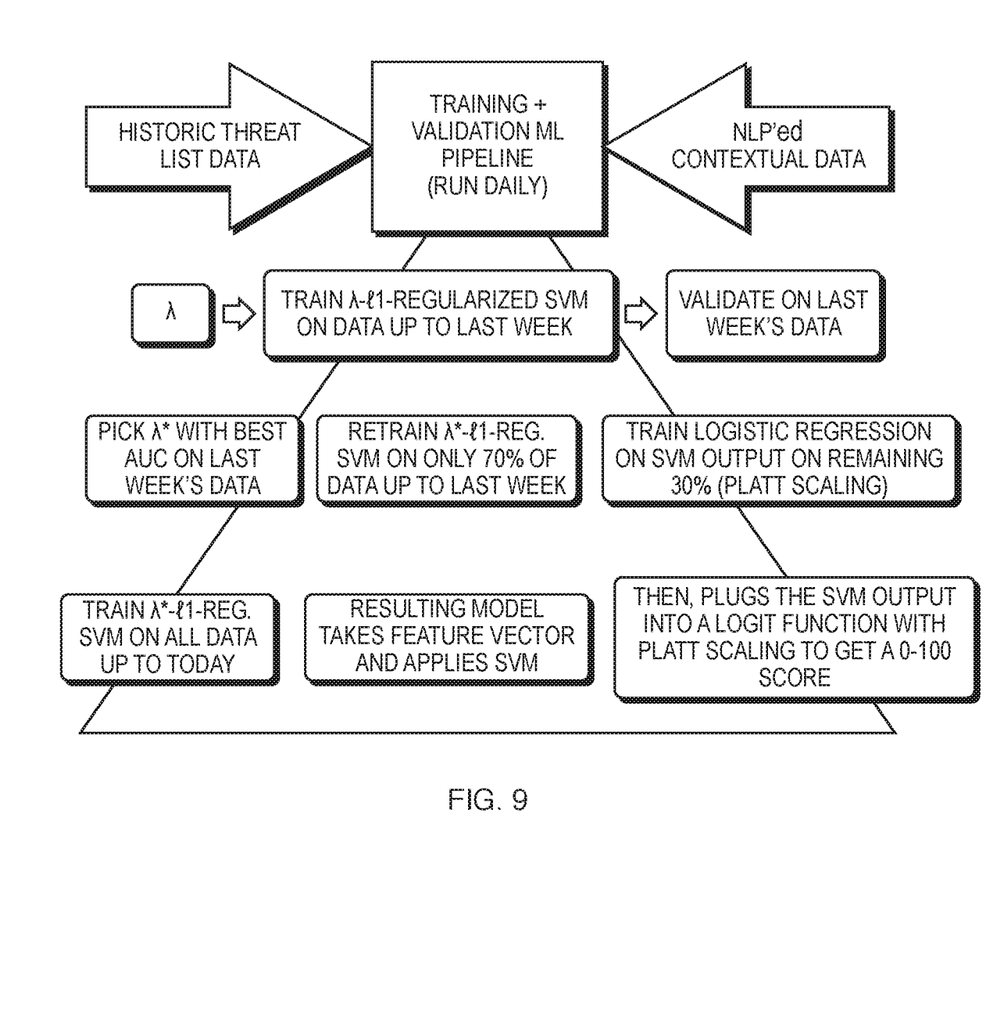
FIG. 9 is a block diagram illustrating operations performed by the predictive scoring system of FIG. 8.
Figure 10:
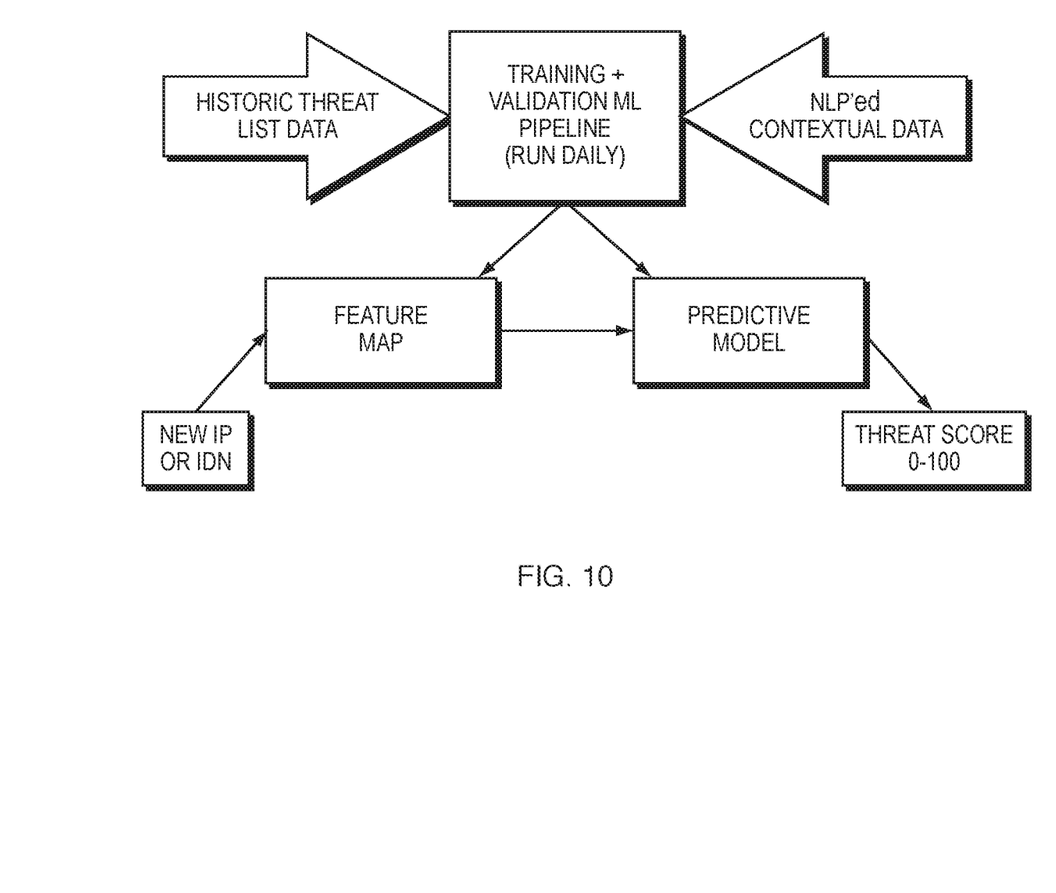
FIG. 10 is a block diagram showing the application of the predictive scoring system of FIG. 8 to new IP addresses.

Referring to FIGS. 8-10, another way to evaluate network threat risk is to do so predictively. This can be accomplished by detecting different types of ongoing activity on nodes in the network, and applying machine learning to predict whether those nodes will become malicious. Any type of machine learning approaches can be employed, such as one that employs a Support Vector Machine (SVM) supervised learning model. Initially, the system can be trained on historical threat lists and open source intelligence leads, but the model can also be refined as it operates.

Features selected for the machine learning process can include logical or physical proximity scoring, detecting non-malicious behavior of known bad actors, and activity associated with events including cyber attacks, exploits, and data leaks. The system can detect activity related to a wide variety of sources, such as open web, social media, forums, paste sites, and dark net sites (e.g., TOR/Onion sites). It can also detect activity associated with technical entities including hashes and malware. And it can present its predictions in a variety of formats, such as a score, a categorization, or a flag. Ontologies can be used to classify the different types of information.

The system described above has been implemented in connection with a special-purpose software program running on a general-purpose computer platform, but it could also be implemented in whole or in part using special-purpose hardware. And while the system can be broken into the series of modules and steps shown in the various figures for illustration purposes, one of ordinary skill in the art would recognize that it is also possible to combine them and/or split them differently to achieve a different breakdown.

The embodiments presented above can benefit from temporal and linguistic processing approaches outlined in U.S. Publication No. 20140013233, entitled INTERACTIVE EVENT-BASED INFORMATION SYSTEM; U.S. Publication Nos. 20100299324 and 20090132582 both entitled INFORMATION SERVICE FOR FACTS EXTRACTED FROM DIFFERING SOURCES ON A WIDE AREA NETWORK; as well as to U.S. Publication No. 20140114941 entitled SEARCH ACTIVITY PREDICTION; and to U.S. Publication No. 20140074827 entitled AUTOMATED PREDICTIVE SCORING IN EVENT COLLECTION, which are all herein incorporated by reference.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A network security system including a processor and memory, comprising:
    a network interface that connects the network security system to a public wide area network that can be accessed with addresses,
    a malicious activity detection subsystem operatively connected to the network interface and operative in connection with the processor and memory to extract information from language content of different textual sources accessed using addresses on the network, to analyze the extracted information to determine whether it represents information that represents a potential threat, and to store the information that is determined to represent a threat,
    a threat prediction subsystem responsive the network interface and operative in connection with the processor and memory to predict information about future threat levels based on application of a trained predictive model to activity addresses on the public wide area network, and to store the predicted information that is determined to represent a threat,
    a scoring subsystem responsive to the information stored by the malicious activity detection subsystem and operative in connection with the processor and memory to provide weighted machine-readable threat scores that include a weighted machine-readable threat score for each of a plurality of the addresses for accessing content on the public wide area network, wherein the scoring subsystem aggregates machine-readable threat levels for the stored predicted information that is determined to represent a threat and the stored information that is determined to represent a threat to obtain the weighted machine-readable threat score for each of the plurality of addresses based on predetermined weightings for different threat types for the stored predicted information that is determined to represent a threat and the stored information that is determined to represent a threat for the different textual sources for that address, and wherein the weighted machine-readable threat scores for at least some of the plurality of addresses are based on one or more of the predicted future threat levels.

2. The network security system of claim 1 further including a threat level quantizer responsive to the scoring subsystem and configured to quantize the weighted threat score for an address.

3. The network security system of claim 2 further including a user interface area responsive to the scoring subsystem and the quantizer and configured to display the quantized weighted threat score in a manner that also conveys one of the threat levels.

4. The network security system of claim 2 further including a user interface area responsive to the scoring subsystem and the quantizer and configured to display the quantized weighted threat score in a color that also conveys one of the threat levels.

5. The network security system of claim 1 further including a user interface area responsive to the scoring subsystem and configured to display the weighted threat score.

6. The network security system of claim 5 further including a further user interface area that is configured to display at least some of the different threat levels and further different threat levels from which the displayed weighted threat score was derived.

7. The network security system of claim 1 wherein the malicious activity detection subsystem is configured to detect malicious activity associated with an IP address.

8. The network security system of claim 1 wherein the malicious activity detection subsystem is configured to detect malicious activity associated with a URL.

9. The network security system of claim 1 wherein the malicious activity detection subsystem is configured to detect malicious activity associated with an Internet Domain Name.

10. The network security system of claim 1, further, comprising:
a source of malicious addresses that lists addresses for accessing content on the network associated with malicious activity,
an address proximity engine responsive to the source of malicious activity data that is both configured to determine measures of logical proximity between addresses for accessing content on the network and configured to determine measures of physical proximity between where addresses for accessing content on the network reside, and
wherein the scoring subsystem is responsive to the address proximity engine and to the source of malicious addresses that is operative to derive a machine-readable logical proximity score for each of at least some of the addresses for accessing content on the network based on the determined measure of logical proximity to at least one of the malicious addresses for accessing content on the network from the source of malicious addresses, and wherein at least some of the weighted machine-readable threat scores are based on one or more machine-readable logical proximity scores.

11. The network security system of claim 10 wherein the threat scoring subsystem is configured to derive a threat score based on threats from a plurality of different physically or logically proximate malicious addresses.

12. The network security system of claim 10 wherein the threat scoring subsystem includes weighted averaging logic configured to derive a weighted threat score based on a weighted average of threats from a plurality of malicious addresses at different degrees of proximity.

13. The network security system of claim 10 wherein the source of malicious addresses and the address proximity engine are operative on IP addresses.

14. The network security system of claim 10 wherein the source of malicious addresses and the address proximity engine are operative on URLs.

15. The network security system of claim 10 wherein the address proximity engine detects proximity at least in part based on membership in subnets.

16. The network security system of claim 10 wherein the address proximity engine detects proximity at least in part based on associations extracted from content on the network.

17. The network security system of claim 10 wherein the source of malicious addresses and the address proximity engine are operative on Internet Domain Names.

18. The network security system of claim 10 wherein the source of malicious addresses and the address proximity engine are operative on an autonomous system level.

19. The network security system of claim 1 wherein the threat prediction subsystem employs a Support Vector Machine supervised learning model.

20. The network security system of claim 1 wherein the threat prediction subsystem is responsive to an address proximity engine that is configured to determine a measure of physical or logical proximity between network addresses.

21. The network security system of claim 1 wherein the malicious activity detection subsystem detects non-malicious behavior of known bad actors.

22. The network security system of claim 1 wherein the malicious activity detection subsystem is configured to detect activity from sources that include open web, social media, forums, paste sites, and dark net sites, including TOR/Onion sites.

23. The network security system of claim 1 wherein the malicious activity detection subsystem is configured to detect activity associated with technical entities including hashes, filenames and malware.

24. The network security system of claim 1 wherein the malicious activity detection subsystem is configured to detect activity associated with events including cyber attacks, exploits, and data leaks.

25. The network security system of claim 1 wherein the threat prediction subsystem is configured to classify information according to ontologies.

26. The network security system of claim 1 wherein the threat prediction subsystem is configured to calculate a risk score.

27. The network security system of claim 10 wherein the address proximity engine is further configured to determine a measure of physical proximity between network addresses, and wherein the threat scoring subsystem is further configured to derive a score for a particular network address based on its physical proximity to at least one of the malicious addresses from the source of malicious addresses.

28. The network security system of claim 1 wherein the scoring subsystem is operative to derive the weighted threat levels for addresses based only on information from wide area network sources.

* * * * *